(12) United States Patent
Larson et al.

(10) Patent No.: US 9,274,926 B2
(45) Date of Patent: Mar. 1, 2016

(54) CONFIGURABLE TESTING OF COMPUTER PROGRAMS

(71) Applicant: Ab Initio Technology LLC, Lexington, MA (US)

(72) Inventors: Brond Larson, Sharon, MA (US); Carl Offner, Sudbury, MA (US); Joseph Skeffington Wholey, III, Belmont, MA (US)

(73) Assignee: AB INITIO TECHNOLOGY LLC, Lexington, MA (US)

( * ) Notice: Subject to any disclaimer, the term of this patent is extended or adjusted under 35 U.S.C. 154(b) by 0 days.

(21) Appl. No.: 14/165,698

(22) Filed: Jan. 28, 2014

(65) Prior Publication Data

US 2014/0189653 A1 Jul. 3, 2014

Related U.S. Application Data

(63) Continuation-in-part of application No. 13/733,403, filed on Jan. 3, 2013, now abandoned.

(51) Int. Cl.
*G06F 9/44* (2006.01)
*G06F 11/36* (2006.01)

(52) U.S. Cl.
CPC .......... *G06F 11/3604* (2013.01); *G06F 11/368* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 3,662,343 A | 5/1972 | Goldstein et al. |
| 3,662,401 A | 5/1972 | Collins et al. |
| 4,922,418 A | 5/1990 | Dolecek |
| 4,972,314 A | 11/1990 | Getzinger et al. |
| 5,127,104 A | 6/1992 | Dennis |
| 5,276,899 A | 1/1994 | Neches |
| 5,280,619 A | 1/1994 | Wang |
| 5,301,336 A | 4/1994 | Kodosky |
| 5,323,452 A | 6/1994 | Dickman et al. |

(Continued)

FOREIGN PATENT DOCUMENTS

| | | |
|---|---|---|
| EP | 0834810 | 4/1998 |
| JP | 64-013189 | 1/1989 |

(Continued)

OTHER PUBLICATIONS

Mattson et al., "Patterns for Parallel Programming," Addison-Wesley Professional ISBN: 0-321-22811-1 (2004).

(Continued)

*Primary Examiner* — Chameli Das
(74) *Attorney, Agent, or Firm* — Occhiuti & Rohlicek LLP

(57) ABSTRACT

Configurable testing of a computer program includes: storing a set of one or more testing specifications, and attribute information defining one or more attributes of a recognizable portion of the computer program; and processing, using at least one processor, the computer program according to at least a first testing specification associated with the computer program. The processing includes: traversing a representation of the computer program that includes elements that represent recognizable portions of the computer program, and while traversing the representation, recognizing recognizable portions of the computer program, and storing values of attributes, defined by the attribute information, of the recognized portions of the computer program.

76 Claims, 9 Drawing Sheets

(56) References Cited

U.S. PATENT DOCUMENTS

| | | | |
|---|---|---|---|
| 5,333,319 A | 7/1994 | Silen | |
| 5,357,632 A | 10/1994 | Pian et al. | |
| 5,418,888 A * | 5/1995 | Alden | 706/48 |
| 5,432,942 A * | 7/1995 | Trainer | 717/131 |
| 5,495,590 A | 2/1996 | Comfort et al. | |
| 5,630,047 A | 5/1997 | Wang | |
| 5,692,168 A | 11/1997 | McMahan | |
| 5,701,400 A | 12/1997 | Amardo | |
| 5,712,971 A | 1/1998 | Stanfill et al. | |
| 5,745,778 A | 4/1998 | Alfieri | |
| 5,799,266 A * | 8/1998 | Hayes | 702/123 |
| 5,802,267 A | 9/1998 | Shirakihara et al. | |
| 5,805,462 A | 9/1998 | Poirot et al. | |
| 5,857,204 A | 1/1999 | Lordi et al. | |
| 5,890,997 A * | 4/1999 | Roth | 482/8 |
| 5,923,832 A | 7/1999 | Shirakihara et al. | |
| 5,924,095 A | 7/1999 | White | |
| 5,930,794 A | 7/1999 | Linenbach et al. | |
| 5,933,640 A | 8/1999 | Dion | |
| 5,966,072 A | 10/1999 | Stanfill et al. | |
| 5,999,729 A | 12/1999 | Tabloski, Jr. et al. | |
| 6,006,242 A | 12/1999 | Poole et al. | |
| 6,012,094 A | 1/2000 | Leyman | |
| 6,014,670 A | 1/2000 | Zamanian et al. | |
| 6,016,516 A | 1/2000 | Horikiri | |
| 6,032,158 A | 2/2000 | Mukhopadhhyay et al. | |
| 6,038,558 A | 3/2000 | Powers et al. | |
| 6,044,211 A | 3/2000 | Jain | |
| 6,044,374 A | 3/2000 | Nesamoney et al. | |
| 6,044,394 A | 3/2000 | Cadden et al. | |
| 6,088,716 A | 7/2000 | Stanfill et al. | |
| 6,145,017 A | 11/2000 | Ghaffari | |
| 6,173,276 B1 | 1/2001 | Kant et al. | |
| 6,208,345 B1 | 3/2001 | Sheard et al. | |
| 6,256,637 B1 | 7/2001 | Venkatesh et al. | |
| 6,259,988 B1 | 7/2001 | Galkowski et al. | |
| 6,272,650 B1 | 8/2001 | Meyer et al. | |
| 6,301,601 B1 | 10/2001 | Helland | |
| 6,314,114 B1 | 11/2001 | Coyle et al. | |
| 6,324,437 B1 | 11/2001 | Frankel et al. | |
| 6,330,008 B1 | 12/2001 | Razdow et al. | |
| 6,332,212 B1 * | 12/2001 | Organ et al. | 717/128 |
| 6,339,775 B1 | 1/2002 | Zamanian et al. | |
| 6,400,996 B1 | 6/2002 | Hoffberg et al. | |
| 6,401,216 B1 | 6/2002 | Meth et al. | |
| 6,437,796 B2 | 8/2002 | Sowizral et al. | |
| 6,449,711 B1 | 9/2002 | Week | |
| 6,480,876 B2 | 11/2002 | Rehg et al. | |
| 6,496,961 B2 | 12/2002 | Gupta et al. | |
| 6,538,651 B1 | 3/2003 | Hayman et al. | |
| 6,584,581 B1 | 6/2003 | Bay et al. | |
| 6,608,628 B1 | 8/2003 | Ross et al. | |
| 6,611,862 B2 | 8/2003 | Reisman | |
| 6,651,234 B2 | 11/2003 | Gupta et al. | |
| 6,654,907 B2 | 11/2003 | Stanfill et al. | |
| 6,658,464 B2 | 12/2003 | Reisman | |
| 6,715,145 B1 | 3/2004 | Bowman-Amuah | |
| 6,728,879 B1 | 4/2004 | Atkinson | |
| 6,760,903 B1 * | 7/2004 | Morshed et al. | 717/130 |
| 6,813,761 B1 | 11/2004 | Das et al. | |
| 6,816,825 B1 | 11/2004 | Ashar et al. | |
| 6,832,369 B1 | 12/2004 | Kryka et al. | |
| 6,848,100 B1 | 1/2005 | Wu et al. | |
| 6,879,946 B2 | 4/2005 | Rong et al. | |
| 6,951,013 B1 * | 9/2005 | Lozins | 717/125 |
| 7,062,483 B2 | 6/2006 | Ferrari et al. | |
| 7,082,604 B2 | 7/2006 | Schneiderman | |
| 7,085,426 B2 | 8/2006 | August | |
| 7,103,597 B2 | 9/2006 | McGovern | |
| 7,103,620 B2 | 9/2006 | Kunz et al. | |
| 7,130,484 B2 | 10/2006 | August | |
| 7,137,116 B2 | 11/2006 | Parkes et al. | |
| 7,164,422 B1 | 1/2007 | Wholey et al. | |
| 7,165,030 B2 | 1/2007 | Yi et al. | |
| 7,167,850 B2 | 1/2007 | Stanfill | |
| 7,316,001 B2 | 1/2008 | Gold et al. | |
| 7,356,819 B1 | 4/2008 | Ricart et al. | |
| 7,398,514 B2 | 7/2008 | Ulrich et al. | |
| 7,417,645 B2 | 8/2008 | Beda et al. | |
| 7,457,984 B2 | 11/2008 | Kutan | |
| 7,467,383 B2 | 12/2008 | Inchingolo et al. | |
| 7,505,975 B2 | 3/2009 | Luo | |
| 7,577,628 B2 | 8/2009 | Stanfill | |
| 7,636,699 B2 | 12/2009 | Stanfill | |
| 7,716,630 B2 | 5/2010 | Wholey et al. | |
| 7,840,949 B2 | 11/2010 | Schumacher et al. | |
| 7,870,556 B2 | 1/2011 | Wholey et al. | |
| 7,877,350 B2 | 1/2011 | Stanfill et al. | |
| 8,566,641 B2 | 10/2013 | Douros et al. | |
| 2001/0055019 A1 | 12/2001 | Sowizral et al. | |
| 2002/0080181 A1 | 6/2002 | Razdow et al. | |
| 2002/0087921 A1 | 7/2002 | Rodriguez | |
| 2002/0091747 A1 | 7/2002 | Rehg et al. | |
| 2002/0091748 A1 | 7/2002 | Rehg et al. | |
| 2002/0111876 A1 | 8/2002 | Rudraraju et al. | |
| 2002/0129340 A1 | 9/2002 | Tuttle | |
| 2002/0147745 A1 | 10/2002 | Houben et al. | |
| 2002/0184616 A1 | 12/2002 | Chessell et al. | |
| 2003/0004771 A1 | 1/2003 | Yaung | |
| 2003/0023413 A1 | 1/2003 | Srinivasa | |
| 2003/0033432 A1 | 2/2003 | Simpson et al. | |
| 2003/0091055 A1 | 5/2003 | Craddock et al. | |
| 2003/0126240 A1 | 7/2003 | Vosseler | |
| 2003/0204804 A1 | 10/2003 | Petri et al. | |
| 2004/0006745 A1 | 1/2004 | Van Heldan et al. | |
| 2004/0041838 A1 | 3/2004 | Adusumilli et al. | |
| 2004/0073529 A1 | 4/2004 | Stanfill | |
| 2004/0093559 A1 | 5/2004 | Amaru et al. | |
| 2004/0098452 A1 | 5/2004 | Brown et al. | |
| 2004/0105391 A1 * | 6/2004 | Charcranoon | H04L 43/0829 370/252 |
| 2004/0107414 A1 | 6/2004 | Bronicki et al. | |
| 2004/0111469 A1 | 6/2004 | Manion et al. | |
| 2004/0148373 A1 | 7/2004 | Childress et al. | |
| 2004/0177099 A1 | 9/2004 | Ganesh et al. | |
| 2004/0205726 A1 | 10/2004 | Chedgey et al. | |
| 2004/0207665 A1 | 10/2004 | Mathur | |
| 2004/0210831 A1 | 10/2004 | Feng et al. | |
| 2004/0225657 A1 | 11/2004 | Sarkar | |
| 2004/0260590 A1 | 12/2004 | Golani et al. | |
| 2004/0268185 A1 * | 12/2004 | Tan et al. | 714/38 |
| 2005/0021689 A1 | 1/2005 | Marvin et al. | |
| 2005/0034112 A1 | 2/2005 | Stanfill | |
| 2005/0039176 A1 | 2/2005 | Fournie | |
| 2005/0059046 A1 | 3/2005 | Labrenz et al. | |
| 2005/0086360 A1 | 4/2005 | Mamou et al. | |
| 2005/0097515 A1 * | 5/2005 | Ribling | 717/124 |
| 2005/0097561 A1 | 5/2005 | Schumacher et al. | |
| 2005/0102670 A1 | 5/2005 | Bretl et al. | |
| 2005/0144277 A1 | 6/2005 | Flurry et al. | |
| 2005/0144596 A1 | 6/2005 | McCullough et al. | |
| 2005/0149935 A1 | 7/2005 | Benedetti | |
| 2005/0172268 A1 * | 8/2005 | Kuturianu et al. | 717/124 |
| 2005/0177531 A1 | 8/2005 | Bracewell | |
| 2005/0193056 A1 | 9/2005 | Schaefer et al. | |
| 2005/0216421 A1 | 9/2005 | Barry et al. | |
| 2005/0240621 A1 | 10/2005 | Robertson et al. | |
| 2005/0262470 A1 | 11/2005 | Gavrilov | |
| 2005/0289527 A1 | 12/2005 | Illowsky et al. | |
| 2006/0085462 A1 | 4/2006 | Todd | |
| 2006/0095722 A1 | 5/2006 | Biles et al. | |
| 2006/0098071 A1 | 5/2006 | Tarditi et al. | |
| 2006/0130041 A1 * | 6/2006 | Pramanick et al. | 717/168 |
| 2006/0206872 A1 | 9/2006 | Krishnaswamy | |
| 2006/0282474 A1 | 12/2006 | MacKinnon | |
| 2006/0294150 A1 | 12/2006 | Stanfill et al. | |
| 2006/0294459 A1 | 12/2006 | Davis et al. | |
| 2007/0011668 A1 | 1/2007 | Wholey et al. | |
| 2007/0022077 A1 | 1/2007 | Stanfill | |
| 2007/0035543 A1 | 2/2007 | David et al. | |
| 2007/0094211 A1 | 4/2007 | Sun et al. | |
| 2007/0118839 A1 | 5/2007 | Berstis et al. | |
| 2007/0139441 A1 | 6/2007 | Lucas et al. | |
| 2007/0143360 A1 | 6/2007 | Harris et al. | |

(56) References Cited

U.S. PATENT DOCUMENTS

| | | | |
|---|---|---|---|
| 2007/0150429 A1 | 6/2007 | Huelsman et al. | |
| 2007/0174185 A1 | 7/2007 | McGovern | |
| 2007/0179923 A1 | 8/2007 | Stanfill | |
| 2007/0239766 A1 | 10/2007 | Papaefstathiou et al. | |
| 2007/0271381 A1 | 11/2007 | Wholey et al. | |
| 2007/0285440 A1 | 12/2007 | MacInnis et al. | |
| 2008/0049022 A1 | 2/2008 | Sherb et al. | |
| 2008/0126755 A1 | 5/2008 | Wu et al. | |
| 2008/0244524 A1* | 10/2008 | Kelso | 717/124 |
| 2008/0250049 A1* | 10/2008 | Chakra et al. | 707/102 |
| 2008/0288608 A1 | 11/2008 | Johnson | |
| 2008/0294615 A1 | 11/2008 | Furuya et al. | |
| 2009/0030863 A1 | 1/2009 | Stanfill et al. | |
| 2009/0064147 A1 | 3/2009 | Beckerle et al. | |
| 2009/0083313 A1 | 3/2009 | Stanfill et al. | |
| 2009/0113196 A1* | 4/2009 | Jan et al. | 713/2 |
| 2009/0182728 A1 | 7/2009 | Anderson | |
| 2009/0193391 A1 | 7/2009 | Miller et al. | |
| 2009/0193417 A1 | 7/2009 | Kahlon | |
| 2009/0224941 A1 | 9/2009 | Kansal et al. | |
| 2009/0235267 A1 | 9/2009 | McKinney et al. | |
| 2009/0245426 A1* | 10/2009 | Ratnakar et al. | 375/327 |
| 2009/0327196 A1 | 12/2009 | Studer et al. | |
| 2010/0042976 A1 | 2/2010 | Hines | |
| 2010/0070955 A1 | 3/2010 | Kahlon | |
| 2010/0169137 A1 | 7/2010 | Jastrebski et al. | |
| 2010/0174694 A1 | 7/2010 | Staebler et al. | |
| 2010/0180344 A1 | 7/2010 | Malyshev et al. | |
| 2010/0211953 A1 | 8/2010 | Wakeling et al. | |
| 2010/0218031 A1 | 8/2010 | Agarwal et al. | |
| 2010/0281462 A1 | 11/2010 | Festa | |
| 2010/0281488 A1 | 11/2010 | Krishnamurthy et al. | |
| 2011/0078500 A1 | 3/2011 | Douros et al. | |
| 2011/0093433 A1 | 4/2011 | Stanfill et al. | |
| 2011/0239186 A1* | 9/2011 | Zinkovsky et al. | 717/107 |
| 2011/0307897 A1 | 12/2011 | Atterbury et al. | |
| 2012/0036498 A1 | 2/2012 | Akirekadu et al. | |
| 2012/0054255 A1 | 3/2012 | Buxbaum et al. | |
| 2012/0216176 A1* | 8/2012 | Gaikwad et al. | 717/124 |
| 2012/0233599 A1* | 9/2012 | Valdiviezo Basauri et al. | 717/126 |
| 2013/0290928 A1* | 10/2013 | Johnson | 717/109 |
| 2014/0026125 A1* | 1/2014 | Pasala et al. | 717/126 |
| 2014/0068566 A1 | 3/2014 | Coronado et al. | |

FOREIGN PATENT DOCUMENTS

| | | |
|---|---|---|
| JP | 06-236276 | 8/1994 |
| JP | 08-278892 | 10/1996 |
| JP | 08-305576 | 11/1996 |
| JP | 63-231613 | 9/1998 |
| JP | 11-184766 | 7/1999 |
| JP | 2000-99317 | 4/2000 |
| JP | 2006-504160 | 2/2006 |
| WO | WO 98/00791 | 1/1998 |
| WO | WO 02/11344 | 2/2002 |
| WO | WO 2005/001687 | 1/2005 |
| WO | WO 2005/086906 | 9/2005 |
| WO | WO 2008/124319 | 10/2008 |
| WO | WO 2009/039352 | 3/2009 |

OTHER PUBLICATIONS

European Examination Report issued in related EP Application No. 10 741 775.0 on Jul. 7, 2014.

International Search Report and Written Opinion, International Application No. PCT/US2013/076416, mailed Apr. 9, 2014 (10 pages).

Babaoglu, O et al., "Mapping parallel computations onto distributed systems in Paralex" Compuero '91. Advanced Computer Technology, Reliable Systems and Applications. 5th Annual European Computer Conference. Proceedings. Bologna, Italy May 13-16, 1991, Los Alamitos, CA, USA, IEEE Comput. Soc, US, May 13, 1991, pp. 123-130.

Baer, J.L. et al., "Legality and Other Properties of Graph Models of Computations." Journal of the Association for Computing Machinery, vol. 17, No. 3, Jul. 1970, pp. 543-554.

Bookstein, A. et al., "Modeling Word Occurrences for the Compression of Concordances." ACM Transactions on Information Systems, vol. 15, No. 3, Jul. 1997, pp. 254-290.

Burch, J.R. et al., "Sequential circuit verification using symbolic model checking." In Design Automation Conference, 1990, Proceedings of the 27th ACM/IEEE. Jun. 24-28, 1990, pp. 46-51.

Control-M; New Dimension Software. User Manual. New Dimension Software Ltd., 1999.

Cytron, Ron et al., "Efficiently Computing Static Single Assignment Form and the Control Dependence Graph." ACM Transactions on Programming Languages and Systems, vol. 13, No. 4, Oct. 1991, pp. 451-490.

Ebert, Jurgen et al., "A Declarative Approach to Graph-Based Modeling." Workshop on Graph-Theoretic Concepts in Computer Science, 1994, pp. 1-19.

Gamma et al. "Design Patterns: Elements of Reusable Object-Oriented Software", Sep. 1999.

Guyer et al., "Finding Your Cronies: Static Analysis for Dynamic Object Colocation." Oct. 2004, ACM, pp. 237-250.

Grove et al., "A Framework for Call Graph Construction Algorithms." Nov. 2001, ACM TOPLAS, vol. 23, Issue 6, pp. 685-746.

Herniter, Marc E., "Schematic Capture with MicroSim PSpice," 2nd Edition, Prentice Hall, Upper Saddle River, N.J., 1996, pp. 51-52, 255-280, 292-297.

Jawadi, Ramamohanrao et al., "A Graph-based Transaction Model for Active Databases and its Parallel Implementation." U. Florida Tech. Rep TR94-0003, 1994, pp. 1-29.

Just et al., "Review and Analysis of Synthetic Diversity for Breaking Monocultures." Oct. 2004, ACM, pp. 23-32.

Kebschull, U. et al., "Efficient Graph-Based Computation and Manipulation of Functional Decision Diagrams." University of Tubingen, 1993 IEEE, pp. 278-282.

Krahmer et al., "Graph-Based Generation of Referring Expressions." Mar. 2003, MIT Press, vol. 29, No. 1, pp. 53-72.

Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.

Li, Xiqing et al., "A Practical External Sort for Shared Disk MPPs." Proceedings of Supercomputing '93, 1993, 24 pages.

Martin, David et al., "Models of Computations and Systems—Evaluation of Vertex Probabilities in Graph Models of Computations." Journal of the Association for Computing Machinery, vol. 14, No. 2, Apr. 1967, pp. 281-299.

Ou, Chao-Wei et al., "Architecture-Independent Locality-Improving Transformations of Computational Graphs Embedded in k-Dimensions." Proceedings of the 9th International Conference on Supercomputing, 1995, pp. 289-298.

"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02 >, 5 pages.

Romberg, M., "UNICORE: Beyond Web-based Job-Submission," Proceedings of the 42nd Cray User Group Conference, Noordwijk (May 22-26, 2000).

Stanfill, Craig, "Massively Parallel Information Retrieval for Wide Area Information Servers." 1991 IEEE International Conference on Systems, Man and Cybernetics, Oct. 1991, pp. 679-682.

Stanfill, Craig et al., "Parallel Free-Text Search on the Connection Machine System." Communications of the ACM, vol. 29, No. 12, Dec. 1986, pp. 1229-1239.

Stanfill, Craig, "The Marriage of Parallel Computing and Information Retrieval." IEE Colloquium on Parallel Techniques for Information Retrieval, Apr. 1989, 5 pages.

"Unicenter AutoSys Job Management," Computer Associates, Copyright 2001.

Vajracharya, Suvas et al., "Asynchronous Resource Management." Proceedings of the 15th International Parallel and Distributed Processing Symposium, Apr. 2001, 10 pages.

(56) References Cited

OTHER PUBLICATIONS

"Visual Lint: Squash Bugs Early with Interactive C/C++, C# and Java Code Analysis for Microsoft Visual Studio and Eclipse," [ retrieved from the internet Dec. 3, 2012: www.riverblade.co.uk/products/visual_lint.] (2 pages).
Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.
"Topological sorting," Wikipedia, accessed Dec. 10, 2012, 2 pages.
Russell, Nick, et al., "Workflow Control-Flow Patterns A Revised View," Workflow Patterns Initiative, 2006, pp. 1-134.
van der Aalst, W.M.P., et al., "Workflow Patterns," Distributed and Parallel Databases, 14, 5-51, 2003.
Shoten, Iwanami, "Encyclopedic Dictionary of Computer Science," (with English Translation), May 25, 1990, p. 741.
Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.
Evripidou, Paraskevas, et al., "Incorporating input/output operations into dynamic data-flow graphs," Parallel Computing 21 (1995) 1285-1311.
Frankl, Phyllis G., et al., "An Applicable Family of Data Flow Testing Criteria," IEEE Transactions on Sofrware Engineering, vol. 14, No. 10, Oct. 1988, pp. 1483-1498.
Whiting, Paul G., et al., "A History of Data-Flow Languages," IEEE Annals of the History of Computing, vol. 16, No. 4, 1994, pp. 38-59.
International Search Report & Written Opinion received in PCT application No. PCT/US2011/040440, mailed Oct. 12, 2011, 13 pages.
European Search Report issued in application No. EP10003554, dated Sep. 24, 2010, 7 pages.
International Search Report & Written Opinion issued in PCT application No. PCT/US01/23552, mailed Jan. 24, 2002, 5 pages.
International Search Report & Written Opinion issued in PCT application No. PCT/US06/24957, dated Jan. 17, 2008, 14 pages.
International Search Report & Written Opinion issued in PCT application No. PCT/US07/75576, mailed Sep. 16, 2008, 13 pages.
International Search Report & Written Opinion issued in PCT application No. PCT/US08/71206, mailed Oct. 22, 2008, 12 pages.
International Search Report & Written Opinion issued in PCT application No. PCT/US10/49966, dated Nov. 23, 2010, 8 pages.
International Search Report & Written Opinion received in PCT application No. PCT/US10/24036, mailed Mar. 23, 2010, 11 pages.
Supplemental European Search Report issued in application No. EP07813940, dated Nov. 26, 2009, 7 pages.
Supplemental European Search Report issued in application No. EP08796632, dated Sep. 24, 2010, 6 pages.
Japanese Office Action, with English Translation, JP application No. 2011-000948, mailed Jan. 8, 2013, 11 pages.
Supplemental European Search Report issued in application No. EP06774092, dated Dec. 19, 2012, 5 pages.
European Search Report issued in application No. EP10741775, dated Nov. 14, 2012, 4 pages.
Japanese Office Action, with English Translation, JP application No. 2009-523997, mailed Oct. 23, 2012, 7 pages.
Japanese Office Action, with English Translation, JP application No. 2008-519474, mailed Sep. 25, 2012, 8 pages.
Japanese Office Action, with English Translation, JP application No. 2010-518415, mailed Feb. 21, 2013, 11 pages.
Extended European Search Report, EP 12165575, mailed May 10, 2013, 9 pages.
U.S. Appl. No. 09/627,252, filed Jul. 28, 2000.
U.S. Appl. No. 10/268,509, filed Oct. 10, 2002.
U.S. Appl. No. 11/467,724, filed Aug. 28, 2006.
U.S. Appl. No. 11/733,579, filed Apr. 10, 2007.
U.S. Appl. No. 11/169,014, filed Jun. 27, 2005.
U.S. Appl. No. 11/167,902, filed Jun. 27, 2005.
U.S. Appl. No. 12/977,545, filed Dec. 23, 2010.
U.S. Appl. No. 11/836,349, filed Aug. 9, 2007.
U.S. Appl. No. 12/180,141, filed Jul. 25, 2008.
U.S. Appl. No. 12/704,998, filed Feb. 12, 2010.
U.S. Appl. No. 13/161,010, filed Jun. 15, 2011.
U.S. Appl. No. 12/638,588, filed Dec. 15, 2009.
U.S. Appl. No. 13/678,921, filed Nov. 16, 2012.
U.S. Appl. No. 13/678,928, filed Nov. 16, 2012.
U.S. Appl. No. 13/733,403, filed Jan. 3, 2013.

* cited by examiner

```
1   vld_simple_result_t out :: check_replicate_after_input_file (validation_flow_t flow) =
2   begin
3       let problem = 0;
4       if ((flow.source_component_type == "Input_File.mdc") and (flow.target_component_type == "Replicate.mpc"))
5           problem = 1;
6       if (!problem)
7           exit check_replicate_after_input_file;
8       out.message :: " Don't put a Replicate component directly after "
9           + "an Input File component.\n"
10          + " Instead, connect multiple flows directly to the "
11          + "Input File component.\n";
12  end;
```

FIG. 4

```
1    vld_aggr_local_result_t out :: locally_aggregate_reformat_metadata
2        (validation_port_t port) =
3    begin
4        if (not   ((port.owner_type == "Reformat.mpc") and
5                   ((port.port_generic_name == "in") or
6                    (port.port_generic_name == "out"))))
7            exit locally_aggregate_reformat_metadata;
8        out.aggregation_value :: port.resolved_metadata;
9        out.result_object :: port.owner_full_name;
10       out.result_key :: "record_formats";
11   end;
```

FIG. 5

```
1    vld_aggr_global_result_t out :: aggregate_sort_components
2        (validation_component_t component) =
3    begin
4        if (component.component_type != "Sort.mpc")
5            exit aggregate_sort_components;
6        out.aggregation_value :: component.full_name;
7        out.result_key :: "sort_components";
8    end;
```

FIG. 6

```
1   vld_aggr_global_result_t out :: aggregate_base_components
2       (validation_component_t component) =
3   begin
4       if (component.is_graph)
5           exit aggregate_base_components;
6       out.aggregation_value :: component.full_name;
7       out.result_key :: "base_components";
8   end;
```

FIG. 7

```
1    vld_check_aggr_result_t out :: check_how_many_sorts() =
2    begin
3        let validation_vector_str_t components = vld_lookup_by_key("base_components");
4        let validation_vector_str_t sorts = vld_lookup_by_key("sort_components");
5        let long how_many_base_components = length_of(components);
6        let long how_many_sorts = length_of(sorts);
7        let long limit = 0.2 * how_many_base_components;
8        if (how_many_sorts <= limit)
9            exit check_how_many_sorts;
10       out.object_full_names :: [vector];
11       out.messages :: [vector "number of Sort components is greater than "
12                       + string_representation(limit)];
13   end;
```

FIG. 8

CONFIGURABLE TESTING OF COMPUTER PROGRAMS

CROSS-REFERENCE TO RELATED APPLICATIONS

This application is a continuation-in-part of and claims priority to U.S. application Ser. No. 13/733,403, filed on Jan. 3, 2013, incorporated herein by reference.

BACKGROUND

This description relates to the configurable testing of computer programs.

Techniques for testing computer programs in source code form are well known. For example, compilers that transform source code written in a programming language into a computer usable form (e.g., binary code) often test the source code and alert software developer(s) to any issues that may render the code un-executable.

SUMMARY

In one aspect, in general, a computing system for configurable testing of a computer program includes: a storage medium storing a set of one or more testing specifications, and attribute information defining one or more attributes of a recognizable portion of the computer program; and a configurable testing module, including at least one processor, configured to process the computer program according to at least a first testing specification associated with the computer program. The processing includes: traversing a representation of the computer program that includes elements that represent recognizable portions of the computer program, and while traversing the representation, recognizing recognizable portions of the computer program, and storing values of attributes, defined by the attribute information, of the recognized portions of the computer program.

Aspects can include one or more of the following features.

The processing further includes: performing at least one test specified in at least the first testing specification based at least in part on stored values of attributes of one or more recognized portions of the computer program.

The first testing specification includes a test that tests at least one characteristic of the computer program that does not prevent the computer program from executing without error.

The first testing specification includes a test that tests at least one characteristic of the computer program associated with code reuse efficiency.

The first testing specification includes a test that tests at least one characteristic of the computer program associated with memory use constraints.

The characteristic of the computer program associated with memory use constraints includes a maximum amount of main memory that a particular recognized portion of the computer program is allowed to use when the computer program executes.

The first testing specification includes a test that tests a number of times at least one particular operation is used in the computer program.

The first testing specification includes a test that references a value of a name attribute of a recognizable portion of the computer program to determine whether to continue applying the test.

The processing further includes presenting in a user interface a result of at least one test, the result being visually associated with a displayed portion of the computer program on which the test was performed.

The storage medium stores activation information indicating which of the testing specifications are active.

At least one of the testing specifications includes at least one local test that applies to a particular portion of the computer program, and at least one of the testing specifications includes at least one global test that applies to multiple portions of the computer program.

The processing further includes: accessing the activation information to determine one or more testing specifications that are indicated as active.

The set of one or more testing specifications is a hierarchical set that relates at least some of the testing specifications to each other according to a hierarchy.

Accessing the activation information to determine one or more testing specifications that are indicated as active includes identifying active testing specifications along a path up the hierarchy between the first testing specification and a root of the hierarchy.

The processing further includes: while traversing the representation, performing any local tests specified in any active testing specifications based at least in part on stored values of attributes of one or more recognized portions of the computer program.

The processing further includes: while traversing the representation, performing any aggregation functions specified in any active testing specifications based at least in part on stored values of attributes of one or more recognized portions of the computer program.

The processing further includes: after traversing the representation, performing any global tests specified in any active testing specifications based at least in part on stored results of any aggregation functions performed while traversing the representation.

The representation of the computer program is a graph based-representation and the elements include: nodes that represent at least some of the recognizable portions, and links that represent relationships between the recognizable portions represented by the nodes.

The graph-based representation includes a dataflow graph that includes: processing components represented by the nodes, and flows of data between processing components represented by the links.

At least some of the recognizable portions include a flow of data between processing components.

At least some of the recognizable portions include an input or output port of a processing component.

At least some of the recognizable portions include a parameter associated with a processing component or a flow of data between processing components.

The graph-based representation includes a control flow graph that includes: basic blocks of code represented by the nodes, and changes of control between basic blocks represented by the links.

The testing further including receiving user input for specifying at least one testing specification of the set of one or more testing specifications.

At least some of the attribute information is predetermined before at least some of the user input is received.

In another aspect, in general, a computing system for configurable testing of a computer program includes: means for storing a set of one or more testing specifications, and attribute information defining one or more attributes of a recognizable portion of the computer program; and means for processing the computer program according to at least a first testing specification associated with the computer program.

The processing includes: traversing a representation of the computer program that includes elements that represent recognizable portions of the computer program, and while traversing the representation, recognizing recognizable portions of the computer program, and storing values of attributes, defined by the attribute information, of the recognized portions of the computer program.

In another aspect, in general, a method for configurable testing of a computer program includes: storing a set of one or more testing specifications, and attribute information defining one or more attributes of a recognizable portion of the computer program; and processing, using at least one processor, the computer program according to at least a first testing specification associated with the computer program. The processing includes: traversing a representation of the computer program that includes elements that represent recognizable portions of the computer program, and while traversing the representation, recognizing recognizable portions of the computer program, and storing values of attributes, defined by the attribute information, of the recognized portions of the computer program.

In another aspect, in general, software is stored on a computer-readable medium, for configurable testing of a computer program. The software includes instructions for causing a computing system to: store a set of one or more testing specifications, and attribute information defining one or more attributes of a recognizable portion of the computer program; and process the computer program according to at least a first testing specification associated with the computer program. The processing includes: traversing a representation of the computer program that includes elements that represent recognizable portions of the computer program, and while traversing the representation, recognizing recognizable portions of the computer program, and storing values of attributes, defined by the attribute information, of the recognized portions of the computer program.

Aspects can have one or more of the following advantages.

A company, or other organization, may have groups of software developers that develop computer programs for performing various tasks (e.g., processing company or customer data, or processing transactions). While compilers, debugging systems, or other core error testing systems are able to test for correctness of the programs being developed, it may be useful to enable a testing system to be extended in flexible ways to test for specific conventions or programming style that different groups in the organization may wish to follow. The techniques described herein enable the definition of configurable testing extensions that can be customized for different groups (or for different branches of a hierarchical organization, as described in more detail below). To facilitate such flexible extension of the testing system, the configurable testing system is configured to collect information about various attributes of recognizable portions of a computer program so that tests can be defined for those attributes. For example, in an organization that develops programs for processing data, there may be portions of a program that correspond to the movement of data from one program module to another, and portions of a program that correspond to data processing functions or data transformations. The collected information about these portions of the program enables a user to define a test relating to the functional structure or efficiency, for example, of a computer program (e.g., to recognize certain uses or arrangements various program modules that may be inefficient or incompatible with known conventions). These tests enable the development environment to provide visual indications to a developer automatically about various undesirable conditions that may prevail in the computing system that will be executing the program being developed. For example, for programs that process relatively large amounts of data in a relatively short amounts of time, certain technical conditions of the programmed computing system that effect computation efficiency can be automatically flagged to the developer at the time the program is being developed. Those conditions may be identified based on characteristics of the computer program, even if those characteristics would not prevent the computer program from executing without error. Solution of the technical problem of automatically identifying those characteristics is facilitated by providing stored information about attributes of recognizable portions of the computer program.

Other features and advantages of the invention are apparent from the following description, and from the claims.

DESCRIPTION OF DRAWINGS

FIG. 4 is an example code listing of an exemplary simple test.
FIG. 5 is an example code listing of an exemplary local aggregation function.
FIG. 6 is an example code listing of a first exemplary global aggregation function.
FIG. 7 is an example code listing of a second exemplary global aggregation function.
FIG. 8 is an example code listing of an exemplary aggregation test.

DESCRIPTION

1 System Overview

Figure 1:
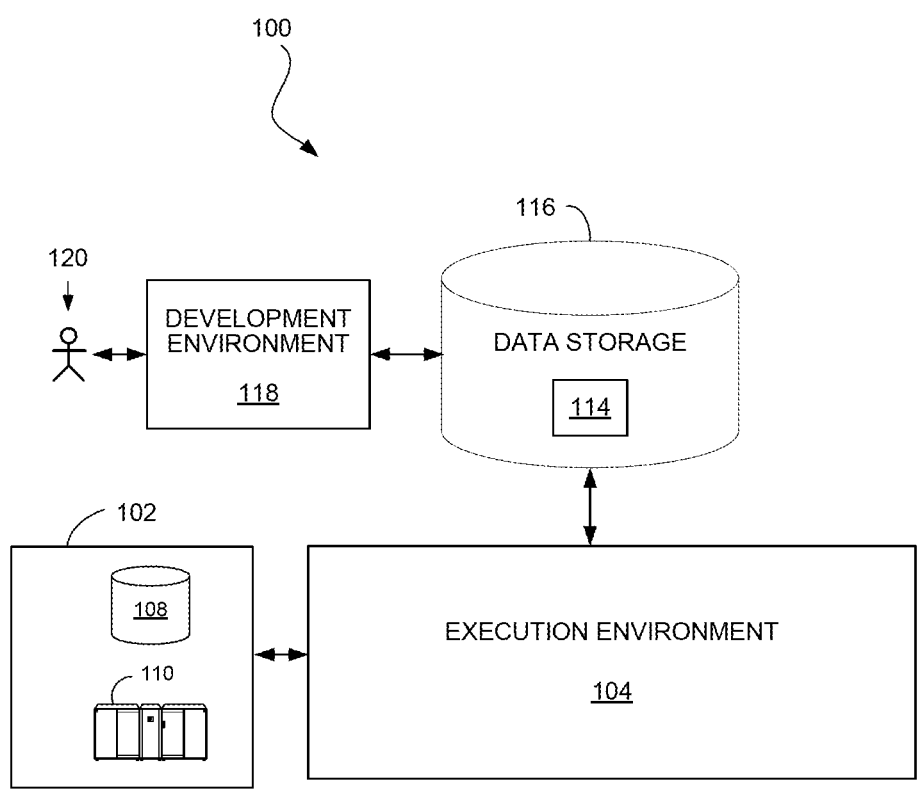
FIG. 1 is a diagram of a data processing system.

FIG. 1 shows an exemplary data processing system 100 in which the configurable testing techniques can be used. The system 100 includes a data source 102, an execution environment 104, a development environment 118, and a data storage system 116 accessible to the execution environment 104 and the development environment 118. The data source 102 may include one or more sources of data such as storage devices or connections to online data streams, each of which may store or provide data in any of a variety of formats (e.g., database tables, spreadsheet files, flat text files, or a native format used by a mainframe).

The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

In general, the execution environment 104 is configured to read data from the data source 102 and to execute a computer program 114 to apply a data processing algorithm to the data to generate output data. That output data may be stored back in the data source 102 or in the data storage system 116, or otherwise used. In some examples, the computer program 114 is implemented as a dataflow graph that includes vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,566,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection.

The execution environment 104 can receive data from a variety of types of systems that may embody the data source 102, including different forms of database systems. The data may be organized as records having values for respective fields (also called "attributes" or "columns"), including possibly null values. When first reading data from a data source, the execution environment 104 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

The data storage system 116 is also accessible to the development environment 118, which enables a developer 120 to develop the dataflow graphs described above, including specifying vertices (representing components or datasets) connected by directed links (representing flows of work elements) between the vertices. In some examples, the development environment 118 is configured to facilitate configurable testing of the dataflow graph specified by the developer 120, including specifying and applying user-defined extension tests, as is described in greater detail below.

2 Configurable Testing Examples

Figure 2:
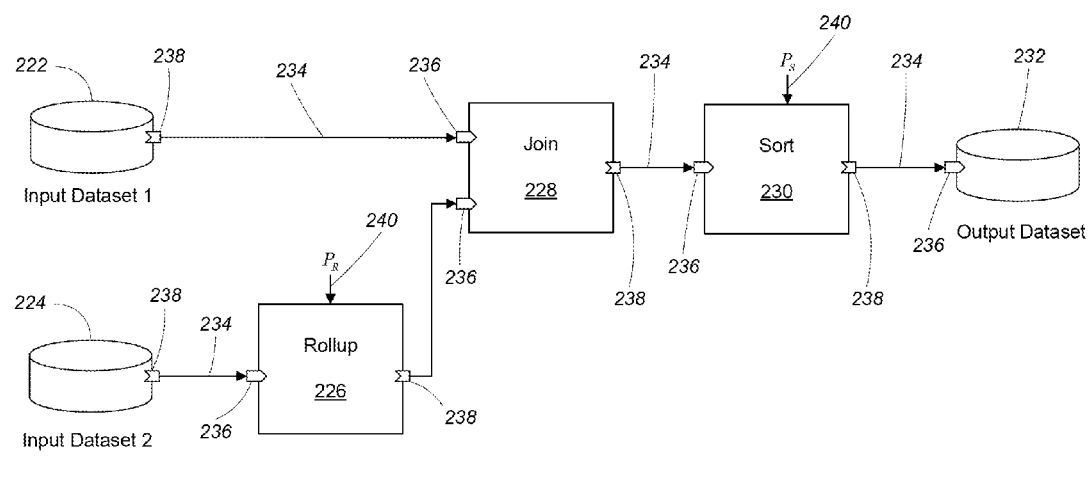
FIG. 2 is a diagram of a dataflow graph.

Referring to FIG. 2, a simple exemplary dataflow graph 200 (one example of a dataflow graph that may be executed in the execution environment 104) includes a first input dataset 222, a second input dataset 224, a number of components 226, 228, 230 and an output dataset 232. The components 226, 228, 230 and datasets 222, 224, 232 are connected together by flows 234, which connect input ports 236 and output ports 238 of the components 226, 228, 230 and datasets 222, 224, 232 to each other. The flows that link components to each other and to datasets represent flows of work elements, such as records of a dataset or data elements that represent intermediate results of a computation performed by a component.

Some components such as the 'Rollup' component 226 and the 'Sort' component 230 also include input parameters 240 which are used to configure the functionality of the components 226, 230. For example, an input parameter may include a reference to a value that will be supplied at runtime when the dataflow graph 200 is being prepared for execution.

During development of the dataflow graph 200, one or more developers may inadvertently introduce different types of errors. For example, in some instances, when specifying (i.e., constructing) the graph 200 using the development environment 118, a developer 120 may introduce one or more errors that will prevent the graph 200 from running. For example, the developer 120 may neglect to specify one or more of the input parameters 240 to the components, the developer may neglect to connect a flow 234 to all of the required input ports 236 of a given component, or the developer 120 may connect an incorrect data type to an input port 236 of a component. In other examples, the developer 120 could specify a graph 200 that, while technically functional, does not conform to style guidelines and/or best practices for graph development. Thus, there is a need to test the graphs specified by developers to inform the developers about different programming style preferences or to warn the developers of the presence of different types of inefficiencies, in addition to warning the developers of presence of different types of errors or identifying characteristics that would prevent the computer program from executing without error.

Figure 3:
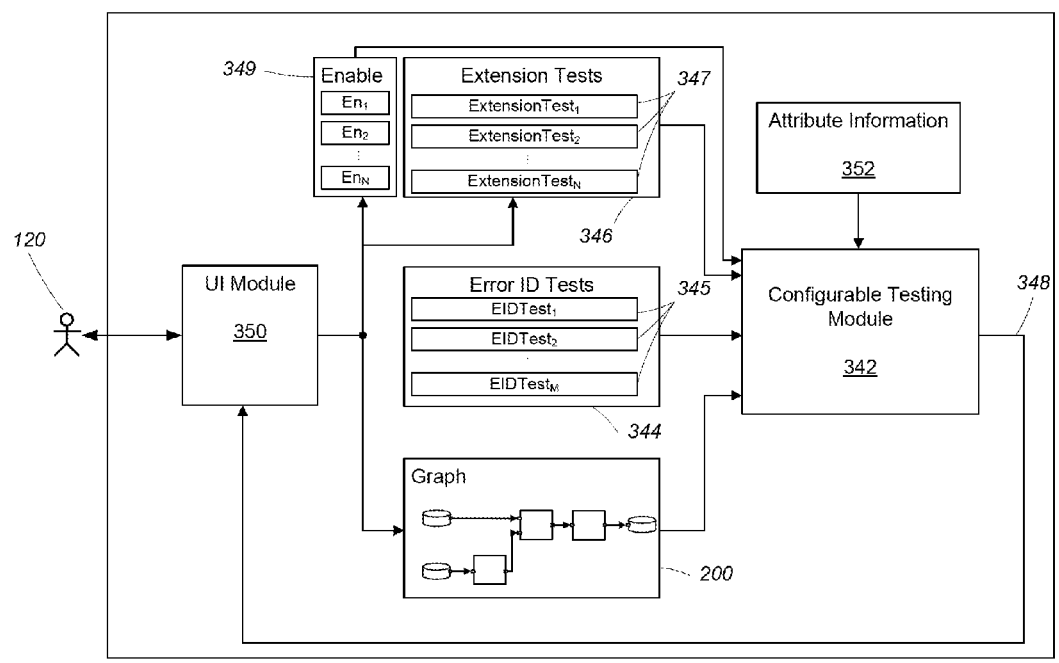
FIG. 3 is a diagram of a configurable testing module.

Referring to FIG. 3, an example of the development environment 118 of FIG. 1 includes a user interface (UI) module 350 and a configurable testing module 342 (among other elements, which are not shown for the sake of simplicity). The developer 120 specifies a dataflow graph 200 and a set of extension tests 346 through a user interface (e.g., displayed on a screen) managed by the user interface module 350. The configurable testing module 342 receives a set of error identification tests 344 (in some examples, from the data storage system 116 of FIG. 1), the set of extension tests 346 (in some examples, from the data storage system 116 of FIG. 1), and the dataflow graph 200 as input. The configurable testing module 342 traverses or 'walks through' the graph (i.e., 'visits' every component, flow, port, and parameter) and applies the tests included in the set of error identification tests 344 and any active extension tests included in the set of user-defined extension tests 346 to the dataflow graph 200. In some examples, the developer 102 explicitly specifies which extension tests of the set of extension tests 346 are enabled, using an activation module 349. Any of a variety of techniques can be used for receiving input from the developer 120 for enabling selected extension tests. For example, the developer 120 may list in a text file a name identifying each extension test (or function) that is to be activated along with any other relevant information (e.g., a path to a testing specification in which that test or function is defined). Alternatively, the developer 120 may view a list of all extension tests and functions in a text file and select those desired—e.g., type "A" (for active) next to the extension tests or functions that the developer 120 wants applied and type "N" (for not active) next to the extension tests or functions that the developer 120 does not want applied.

The result of the configurable testing module 342 walking through the dataflow graph 200 is a testing output 348. The testing output 348 may include any testing messages that were triggered by applying the various tests to the dataflow graph 200 (e.g., warning messages based on failure of an applied test). The testing output 348 is presented in a user interface to the developer 120 by the user interface module 350. The user interface module 350 can present the testing failures in a way that visually associates each failure with the relevant part of the dataflow graph (or relevant part of the source code or other representation of a computer program). In general, the developer 120 views the testing output 348 and modifies the specification of the dataflow graph 200 if necessary.

2.1 Error Identification Tests

The set of error identification tests 344 includes tests 345 that are designed to alert the developer 120 to serious errors in the specification of the dataflow graph 200. For example, if the developer 120 neglected to connect flows to the input ports of a component in the dataflow graph, the dataflow graph 200 would likely not run at all (i.e., it would not produce useable output and/or execution would halt at some point short of completion). The application of the set of error identification tests 344 by the configurable testing module 342 would alert the developer to such an error, indicating that the error needs to be fixed before the dataflow graph 200 will run. Such error identification tests include tests for syntax errors and other correctness tests that are common in software development environments, and therefore will not be discussed further in this description.

2.2 Extension Tests

Each extension test 347 of the set of extension tests 346 includes one or more user-specified extension procedures that define at least one test or function that can be applied to the dataflow graph 200, such as for the purpose of enforcing company specific styles (e.g., naming conventions, use of subgraphs, etc.), enforcing best practices, and to warn of common dataflow graph development pitfalls.

The developer 120 is able to include in these procedures attributes of any recognizable portions of the dataflow graph (e.g., the data structures listed below for various dataflow graph objects), as defined in stored attribute information 352. For example, components of a dataflow graph may have attributes that identify input and output ports of the component, the type of the component, and other relevant metadata; and flows of a dataflow graph may have attributes that identify upstream and downstream ports and components to which the flow is connected, the type of work elements being transferred along the flow, and other relevant metadata.

In some examples, there are three types of extension procedures for defining, respectively, simple tests, aggregation functions, and aggregation tests. In general, the type of extension procedure is determined by the return type of the defined test or function. For example, a simple test can be defined by writing a procedure with a return type of vld_simple_result_t, an aggregation function can be defined by writing a procedure with a return type of vld_aggr_global_result_t, vld_aggr_global_from_vec_result_t, or vld_aggr_local_result_t, and an aggregation test can be defined by writing a procedure with a return type of vld_check_aggr_result_t.

The configurable testing module 342 evaluates the extension procedures based on values of attributes of recognizable portions of a program such as the dataflow graph 200, in multiple stages. For example, in a first stage, the configurable testing module 342 traverses the dataflow graph 200 and applies the simple tests and the aggregation functions to recognizable objects as the configurable testing module 342 traverses the graph. For example, for each object that the configurable testing module 342 visits while traversing the graph, values of attributes of the object are packaged into a data structure. The data structure is then passed to either a simple test or an aggregation function (both described in detail below), which operates on the data structure. The configurable testing module 342 can traverse the flows and components of the dataflow graph, as well as the ports connecting the flows to the components, in any order. Traversing such parts of a dataflow graph or other computer program enables the configurable testing module 342 to locate each part once within an order that is pre-determined or determined as part of a search algorithm. For example, each part can be located once according to a depth-first search or a breadth-first search). In a second stage, after all of the simple tests and aggregation functions have run, the aggregation tests are run (described in more detail below). The aggregation tests operate on data stores (e.g., lookup tables) populated by the aggregation functions in the first stage. The aggregation tests are therefore able to test global properties of the dataflow graph 200 based on values aggregated from attributes of multiple objects in the graph.

2.2.1 Simple Tests

In general, simple tests run on a single type of construct in a computer program that is being tested (e.g., an expression, statement, or procedure in source code of a computer program, or a component, flow, or port of a computer program expressed as a dataflow graph) and are simple in the sense that they do not require information about other objects in the dataflow graph 200 to be evaluated.

As is noted above, when specifying a test, the developer 120 can designate the test as a simple test by setting the return type of the test to a predefined return type that is common to all simple tests (e.g., vld_simple_result_t). Simple tests receive a single argument, which is a data structure of attribute values specific to an associated object. In some examples, the data structure is a read-only structure that cannot be altered by the test. In some examples, each type of object is associated with a different type of data structure, as defined by the attribute information 352. For example, some different types of data structures that can be passed as arguments to simple tests for different types of objects are:

validation_parameter_t—Parameter data structure, associated with a parameter object, may include the following attribute values: parameter name, parameter type, value (of a resolved parameter), definition (of an unresolved parameter), whether the parameter is required or optional.

validation_component_t—Component data structure, associated with a component object, may include the following attribute values: component name, component type, presence of an input/output dataset coupled to an input/output port of the component.

validation_flow_t—Flow data structure, associated with a flow object, may include the following attribute values: flow name, upstream/downstream ports or components connected to the flow, whether the flow transmits encrypted data, whether the flow transmits compressed data, whether the flow is buffered.

validation_port_t—Port data structure, associated with a port object, may include the following attribute values: port name, dataset or component that contains the port, metadata associated with the port defining the type of data received or provided by the port, whether the port is connected to a flow.

validation_graphinfo_t—Graphinfo data structure, associated with a dataflow graph object, may include information about the dataflow graph as a whole.

Simple tests perform a user-defined test on the information included in the data structure. If the information in the data structure fails the user-defined test, the simple test emits an error indication.

In operation, as the configurable testing module 342 traverses the dataflow graph 200, it recognizes each of the objects in the graph and processes that object accordingly to determine values of various attributes that are defined according to the stored attribute information 352. When the configurable testing module 342 reaches a given type of object, it refers to the attribute information 352 to determine what attributes an object of that type has, and it stores values of those attributes in the appropriate data structure for the given object. The configurable testing module 342 also determines whether there is a simple test associated with the given object. If so, the configurable testing module 342 evaluates the simple test, if necessary passing as an argument information about the given object stored the data structure that may be needed to evaluate the simple test. If the simple test for the given object determines that the attribute values associated with the given object violate the simple test, then the simple test returns an error status, which is accumulated by the configurable testing module 342 such that it can be included in the testing output 348 upon completion of the testing process.

2.2.1.1 Exemplary Simple Test

Referring to FIG. 4, one example of a simple test includes code configured to warn the developer 120 if a Replicate component is placed directly after an Input File component. The purpose of a Replicate component is to receive an input flow of work elements generated during execution of a dataflow graph and duplicate those work elements to provide multiple output flows of identical work elements. Since an Input File component can be directly connected to any number of input ports of other components, there would generally be no reason to place a Replicate component directly after an Input File component. So, even though such placement would not prevent the dataflow graph from executing, this simple test is useful for discouraging that use of a Replicate component, which may only serve to increase the computation overhead and thereby reduce computation efficiency. This is one example of using a simple test to encourage a "best practices" approach to graph design.

Referring to line 1 of FIG. 4, the return type of the extension test specifies that the test is a simple test (i.e., a return type of vld_simple_result_t) named check_replicate_after_input_file which accepts an argument of type validation_flow_t (i.e., the extension test applies to flow objects).

The body of the test begins at line 2 with the keyword begin. At line 3, a variable named problem is created and initialized to 0. Line 4 is a conditional statement which sets the problem variable to 1 if the source component type of the flow (flow.source_component_type) is an Input File component (Input_file.mdc) and the target component type of the flow (flow.target_component_type) is a Replicate component (Replicate.mpc).

Line 6 includes a conditional statement which causes the extension test to exit without issuing any output if the problem variable is equal to 0. Otherwise, if the problem variable is equal to 1 (indicating that a Replicate component does follow an Input File component), then lines 8-11 are executed, causing the following warning message to be issued to the developer 120:

"Don't put a Replicate component directly after an Input File component. Instead, connect multiple flows directly to the Input File component"

The extension test ends at line 12.

2.2.2 Aggregation Functions

Aggregation functions do not emit error messages but instead exist for the purpose of aggregating information from objects in the dataflow graph, or from the dataflow graph as a whole, as the configurable testing module 342 traverses the dataflow graph. After the configurable testing module 342 finishes walking through the graph, the aggregated information is used by the aggregation tests described below. In some examples, there are two main types of aggregation functions: local aggregation functions and global aggregation functions. Examples of extension testing may use either or both as appropriate.

In general, local aggregation functions aggregate information from individual objects in the dataflow graph and global aggregation functions aggregate information from the dataflow graph as a whole. When specifying an aggregation function, the developer can designate the function as a local aggregation function by setting the return type to vld_aggr_local_result_t. Similarly, the developer can designate a function as a global aggregation function by setting the return type to one of: vld_aggr_global_result_t or vld_aggr_global_from_vec_result_t.

In some examples, as the configurable testing module 342 evaluates an aggregation function while traversing the dataflow graph, it populates one of two lookup tables based on its aggregation function type (i.e., local or global). In particular, a first lookup table of the two lookup tables is populated with information from local aggregation functions and a second lookup table of the two lookup tables is populated with information from global aggregation functions. In some examples, aggregated information is stored as vectors of strings in the lookup tables.

2.2.2.1 Exemplary Local Aggregation Function

Referring to FIG. 5, one example of a local aggregation function is configured to aggregate, for each Reformat component in a dataflow graph, a list of all of the resolved metadata (i.e., metadata that can be resolved to a particular values) on its input and output ports.

At line 1 of FIG. 5, the return type of the extension function specifies that the function is a local aggregation function (i.e., a return type of vld_aggr_local_result_t) named locally_aggregate_reformat_metadata which accepts an argument of type validation_port_t (i.e., the extension function applies to port objects).

The body of the function begins at line 3 with the keyword begin. At lines 4-6, a conditional statement tests whether the port which was passed in as an argument belongs to a Reformat component (port.owner_type=="Reformat.mpc") and is an input port (port.port_generic_name=="in") or an output port (port.port_generic_name=="out"). If the above test condition is not satisfied, then the local aggregation function exits without aggregating any information into the local aggregation lookup table. Otherwise, if the above test condition is satisfied, then the resolved metadata for the port (port.resolved_metadata) is aggregated into a vector of strings in the local aggregation lookup table. The vector of strings is accessible by specifying two "keys": "record formats," and the full name of the Reformat component (port.owner_full_name). The extension function ends at line 11.

2.2.2.2 Exemplary Global Aggregation Functions

Referring to FIG. 6, one example of a global aggregation function includes code configured to aggregate a list including all of the Sort components present in a graph.

Referring to lines 1-2 of FIG. 6, the return type of the extension function specifies that the function is a global aggregation function (i.e., a return type of vld_aggr_global_result_t) named aggregate_sort_components which accepts an argument of validation_component_t (i.e., the extension function applies to component objects).

The body of the function begins at line 3 with the keyword begin. At line 4, a conditional statement tests whether the type of the input component argument (component.component_type) is Sort.mpc (i.e., is the component a Sort component). If the test indicates that the input component argument is of a type other than Sort.mpc, the aggregation function exits at line 5 without aggregating anything into the global aggregation lookup table. Otherwise, if the input component argument is of the Sort.mpc type, then the name of the input component argument (component.full_name) is written to the global aggregation lookup table at line 6 and is associated with the sort_components key in the lookup table at line 7. The extension function ends at line 8.

Referring to FIG. 7, another example of a global aggregation function includes code configured to aggregate a list including all of the components present in a graph.

Referring to lines 1-2 of FIG. 7, the return type of the extension function specifies that the function is a global aggregation function (i.e., a return type of vld_aggr_global_result_t) named aggregate_base_components which accepts an argument of validation_component_t (i.e., the extension function applies to component objects).

The body of the function begins at line 3 with the keyword begin. At line 4, a conditional statement tests whether the input component argument is a graph component (component.is_graph). If the test indicates that the input component argument is not a graph component, the aggregation function exits at line 5 without aggregating anything into the global aggregation lookup table. Otherwise, if the input component argument is a graph component, then the name of the input component argument (component.full_name) is written to the global aggregation lookup table at line 6 and is associated with the base_components key in the lookup table at line 7. The extension function ends at line 8.

2.2.3 Aggregation Tests

In general, aggregation tests operate on the information collected by the aggregation functions described above and are capable of emitting an error message if a problem is discovered.

As is noted above, when specifying a test, the developer 120 can designate the test as an aggregation test by setting the return type of the test to a predefined return type which is common to aggregation tests (e.g., vld_check_aggr_result_t). Aggregation tests access the global and local aggregation lookup tables (populated by the aggregation functions described above) for data that is used to evaluate a user-defined test. Some aggregation tests do not require any external arguments or information other than the information aggregated in the lookup tables, and some aggregation tests do optionally accept external arguments to be used in evaluating a test. In some examples, helper functions are provided to the developer 120 to facilitate retrieving information from the lookup tables. For example, the functions:

vld_lookup_by_key(key) and vld_lookup_by_obj_key(obj, key)

can be used to retrieve a vector of strings corresponding to a key, or to an object name and a key, respectively.

As is noted above, aggregation tests are used to discover potential issues in a program that would not stop the program from running but may be indicative of a problem that should be investigated. In some examples, an aggregation test may alert the developer to a potential problem, prompting the developer to modify the program to avoid the problem. In other examples, the aggregation test may alert the developer to a potential problem, which, upon investigation, the developer deems to be an intended behavior of the program. For example, if an aggregation test determines that the number of Sort components in a dataflow graph exceeds a predetermined limit, it will alert the developer to the issue. It is up to the developer to decide whether the number of Sort components is, in fact, excessive.

2.2.3.1 Exemplary Aggregation Test

Referring to FIG. 8, one example of an aggregation test includes code configured to determine if more than 20% of the components in a graph are Sort components, and if so, issue a message to the developer 120. The aggregation test shown in FIG. 8 uses the results of the aggregation functions described above in relation of FIGS. 6 and 7.

Referring to line 1 of FIG. 8, the return type of the extension test specifies that the test is an aggregation test (i.e., a return type of vld_check_aggr_result_t) named check_how_many_sorts, which in this example accepts no external arguments and evaluates the test based only on the aggregated information.

The body of the test begins at line 2 with the keyword begin. At line 3, a vector of strings associated with the key base_components is read from the global aggregation lookup table using the command vld_lookup_by_key("base_components") and assigned to a variable named components. As is illustrated in FIG. 6, the base_components key is associated with a vector of strings which includes the names of all of the components in the dataflow graph. At line 4, a vector of strings associated with the key sort_components is read from the global aggregation lookup table using the command vld_lookup_by_key("sort_components") and assigned to a variable named sorts. As is illustrated in FIG. 7, the sort_components key is associated with a vector of strings which includes the names of all of the Sort components in the dataflow graph.

At line 5, the total number of components in the dataflow graph is determined by calculating the length of the components vector of strings (i.e., length_of(components)). The total number of components in the dataflow graph is stored in the how_many_base_components variable. Similarly, the at line 6, the number of Sort components in the dataflow graph is determined by calculating the length of the sorts vector of strings (i.e., length_of(sorts)). The number of Sort components in the dataflow graph is stored in the variable how_many_sorts variable.

At line 7, the total number of base components (i.e., how_many_base_components) is multiplied by 0.2 and assigned to a variable named limit. At line 8, a conditional statement applies a test to determine if the total number of Sort components in the dataflow graph (i.e., how_many_sorts) is less than or equal to the limit variable. If so, the aggregation test exits at line 9 without issuing an error, indicating that a reasonable number of Sort components are included in the dataflow graph. Otherwise, the aggregation test outputs the following error message at lines 10-12:

"Number of Sort components is greater than <limit>"

The extension test ends at line 13.

2.2.4 Extension Test Hierarchy

In some examples different departments within a company develop different projects that involve different computer programs (e.g., different dataflow graphs) or different portions of a program (e.g., one or more individual objects of a dataflow graph). The departments and/or the projects may have hierarchical relationships according to a development structure. Such a hierarchical development structure can be illustrated as an directed graph (e.g., a tree) or other hierarchical representation.

Figure 9:
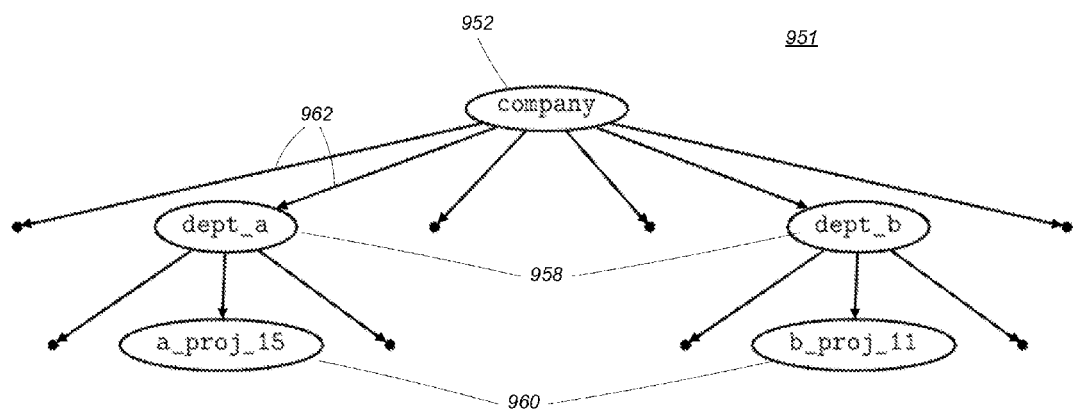
FIG. 9 is a diagram of a project hierarchy.

Referring to FIG. 9, a tree 951 includes a number of nodes connected by directed edges and represents the hierarchical relationships among a number of departments and projects of a company. A root node 952 of the tree 951 represents the company as whole. Some nodes 958 represent departments within the company, and some nodes 960 represent projects associated with the departments. The edges 962 of the tree 951 represent relationships between the different company groups represented by the nodes in the tree 951.

Different testing specifications including extension procedures defining extension tests (and functions) can be specified for and associated with any of the nodes in the tree 951 to ensure that the individual portions of the dataflow graph (or other computer program) conform to specified style guidelines, best practices, etc. In the tree 951 of FIG. 9, there are three levels at which a extension test can be specified: the company level, the department level, and the project level. Note that any number of levels is possible and that the tree 951 of FIG. 9 is just one example of a hierarchical representation.

The company level node 952 is the only node at its level and can be associated with a set of testing specifications that can be used to define a shared set of extension tests. For example, the set of extension tests associated with the company level node 952 will be selectively applied (if activated) to all departments and projects whose nodes are descendants of (i.e., can trace a path over parent-child relationships back to) the company level node 952. For example, a extension test to ensure that all components of a dataflow graph have particular characteristics may be specified for the company level node. All nodes that descend from the company level node 952 are able to access and apply any extension tests defined in testing specifications associated with the company level node 952 or any testing specifications along a path up the tree (or other hierarchy) between that node and the company level node 952. In some examples, extension tests that were specified in a higher level of the tree 951, but not activated there, can be selectively activated separately for any node at any lower level. Any of the department level nodes 958 can also be associated with a set of testing specifications. A set of testing specifications associated with a given department level node can be selectively applied to all projects depending from the given department level node. The extension tests defined in testing specifications associated with all nodes that the given department level node descends from (in this example, the company level node 952) can also be selectively applied to all projects depending from the given department level node.

Any of the project level nodes 960 can also be associated with a set of testing specifications. A set of testing specifications associated with a given project level node can be selectively applied only to the associated project. The extension tests defined in testing specifications associated with all nodes that the given project level node descends from can also be selectively applied to the project.

In some examples, each of the nodes in the tree 951 is associated with an environment (e.g., a file or directory, or other form of dedicated storage space such as a sandbox) that is specific to the node. The testing specifications associated with a node can be stored in the environment along with the computer program being tested (e.g., a specification of a dataflow graph and related files). For example, a single file of source code (e.g., called extensions.xfr) including the definitions of all of the extension tests associated with the node can be stored in the environment.

In some examples, an activation file (e.g., extensions.act) can also be stored in the environment for enabling or disabling individual extension tests. The activation file includes can include a listing of all of the extension tests that are activated for the node. For example, the activation file may include a line with a format such as:
    <name of test> <path to file containing that test>
for each activated extension test. Extension tests that are not listed in the activation file are not activated. In this way, an administrator can choose which extension tests are run for each node. In some examples, if a extension test is activated at a given level, it remains active at any lower levels that depend from that level. This activation feature enables the company to manage a desired policy, in the form of mandated activation of extension tests, which can be mandated over depending project scopes, for example, by (a) the inheritance of activation down the tree; and (b) file system permission control, where the administrator of the company level project has rights to modify activation settings, but lower level administrators would not.

3 Alternatives

In some examples, extension tests are defined using a high level programming language in a file with an .xfr extension. Suitable high level programming languages are C, C++, Java, or proprietary high level programming languages such as Ab Initio's DML programming language.

In some examples, activation files are defined using a high level programming language and are stored as a text file or data file, and have a particular extension (e.g., a .act extension). Suitable high level programming languages are C, C++, Java, XML, or proprietary high level programming languages such as Ab Initio's DML programming language.

In some examples, the file including the source code of the extension tests (i.e., the .xfr file) and the activation file (i.e., the .act file) are stored in the same environment as the graph definition files.

In some examples, the file including the source code of the extension tests (i.e., the .xfr file) imports (i.e., includes) an attribute information file, which defines a number of attributes of recognizable portions of a dataflow graph (or other computer program) that are necessary for defining extension tests. The attributes may include, for example, attributes that enable the specification of tests relating to code reuse efficiency, to memory use constraints, to a number of times that a particular operation is used in a computer program, or to other attributes that may affect efficiency or other programming style preferences.

An example of a recognizable portion of a dataflow graph that enables specification of a test relating to memory use constraints is a parameter. In particular, a parameter called "max_memory" may be associated with a particular component that specifies a maximum amount of main memory that the component is allowed to use when it executes. If that component has used the maximum amount of main memory during execution and still needs more storage space then it would need to use alternative storage (e.g., storage in a hard drive or flash drive serving as a backing store to the main memory). The attribute information 352 would store information defining a parameter name attribute and a parameter definition attribute, which indicate to the configurable testing module 342 that when a parameter object is recognized when traversing a dataflow graph, its parameter name and definition (among other attributes) are to be stored (e.g., within the data structure "validation_parameter_t") to be available for aggregation functions defined in an extension tests file. A simple test or an aggregation test may determine whether the name of a recognized parameter is "max_memory" by including a reference to the parameter name attribute. The module 342 determines whether the value of the parameter name attribute is "max_memory" to determine whether to continue applying the test. For example, the rest of the test may ensure that that particular instance of the max memory parameter has a definition that satisfies certain requirements (e.g., it is defined in terms of another parameter, as opposed to being a constant value).

In general, the order of the extension tests in the .xfr file and the .act file does not necessarily correspond to the order in which the extension tests execute. Rather, the order of execution is determined by the configurable testing module 342 as it traverses the computer program or dataflow graph.

In general, when defining extension tests, a limited amount of information about the data structures that implement the dataflow graph is provided to the developer in the form of attribute information (described above). The attribute information may simplify the view of the (often complex) data structures implementing the dataflow graph for the developer. Also, since the testing system is able to traverse over all of the recognizable parts of a program (i.e., locating each recognizable part a single time according to some order), invoking the relevant extension procedures on each part, it can directly inform the user interface module 350 of testing failures, for display to the user within the appropriate context. For example, a port-level testing failure can be visually associated with the port of the component in the dataflow graph to which it applies. Since the user-written extension procedures can be written in terms of the recognizable program parts, the developers of the extension procedures are not burdened with providing code to locate and recognize those parts themselves.

In some examples, the development module includes a number of simple, commonly used extension tests and functions, which can be used as templates for development of more complex extension tests and functions.

The extension tests and functions described above are simple examples of extension tests and functions, which are presented to facilitate a general understanding of extension tests and functions. However, it is noted that an innumerable number of extension tests and functions are possible.

In some examples all extension tests and functions can be enabled or disabled using a single, master control. For example, an extension switch such as "—testing-extensions" may be specified when instructing the configurable testing module 342 to perform extension testing, the presence of the switch enabling the extension tests and functions. If the extension tests and functions are disabled, only the error identification tests are applied.

The above description includes examples using a dataflow graph representation of a computer program. However, it is noted that the techniques described above are not limited to a dataflow graph representation of a computer program and can be applied to any representation of a computer program that includes elements that represent recognizable portions of the computer program (e.g., a control flow graph that includes basic blocks of code represented by nodes, and changes of control between basic blocks represented by links between the nodes). A recognizable portion of the computer program can be a portion of the computer program that is recognizable based on its specification as a distinct component, module, or block of code that is able to communicate with (e.g., by transfer of data and/or control information) another distinct component, module, or block of code. A recognizable portion of the computer program can also be a portion of the computer program that is recognizable based on its specification as a means of communication (e.g., a data link or communication channel) between such distinct components, modules, or blocks of code.

4 Implementations

The testing approach described above can be implemented using a computer executing suitable software. For instance, the software implements procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a tangible, non-transitory storage medium, such as a CD-ROM, readable by a general or special purpose programmable computer, or delivered (encoded in a propagated signal) over a communication medium of a network to a tangible, non-transitory storage medium of the computer where it is executed. Alternatively, some or all of the functions may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a tangible, non-transitory computer-readable storage medium, configured with a computer program, where the storage medium so configured causes a computer system to operate in a specific and predefined manner to perform one or more of the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. Other embodiments are within the scope of the following claims.

What is claimed is:

1. A computing system for configurable testing of a computer program, the computing system including:
   a storage medium storing a set of one or more testing specifications, and attribute information defining one or more attributes of a recognizable portion of the computer program; and
   a configurable testing module, including at least one processor, configured to process the computer program according to at least a first testing specification associated with the computer program, the first testing specification including at least a first test that applies to multiple portions of the computer program, the processing including:
      traversing a representation of the computer program that includes elements that represent recognizable portions of the computer program,
      while traversing the representation, recognizing recognizable portions of the computer program,
      while traversing the representation, for at least a first recognized portion of the computer program, storing one or more values of one or more attributes of the first recognized portion of the computer program, wherein each attribute whose value is stored while traversing the representation is defined by the attribute information as being an attribute of one or more of the recognizable portions of the computer program, performing any aggregation functions specified in the first testing specification based at least in part on stored values of attributes of one or more recognized portions of the computer program, and performing the first test specified in the first testing specification based at least in part on stored results of any aggregation functions performed while traversing the representation.

2. The system of claim 1, wherein the processing further includes: performing at least one test specified in at least the first testing specification based at least in part on stored values of attributes of one or more recognized portions of the computer program.

3. The system of claim 2, wherein the first testing specification includes a test that tests at least one characteristic of the computer program that does not represent an error that would prevent the computer program from executing.

4. The system of claim 2, wherein the first testing specification includes a test that tests at least one characteristic of the computer program associated with code reuse efficiency.

5. The system of claim 2, wherein the first testing specification includes a test that tests at least one characteristic of the computer program associated with memory use constraints.

6. The system of claim 5, wherein the characteristic of the computer program associated with memory use constraints includes a maximum amount of main memory that a particular recognized portion of the computer program is allowed to use when the computer program executes.

7. The system of claim 2, wherein the first testing specification includes a test that tests a number of times at least one particular operation is used in the computer program.

8. The system of claim 2, wherein the first testing specification includes a test that references a value of a name attribute of a recognizable portion of the computer program to determine whether to continue applying the test.

9. The system of claim 2, the processing further including presenting in a user interface a result of at least one test, the result being visually associated with a displayed portion of the computer program on which the test was performed.

10. The system of claim 1, wherein the storage medium stores activation information indicating which of the testing specifications are active.

11. The system of claim 10, wherein at least one of the testing specifications includes at least one local test that applies to a particular portion of the computer program, and at least one of the testing specifications includes at least one global test that applies to multiple portions of the computer program.

12. The system of claim 11, wherein the processing further includes: accessing the activation information to determine one or more testing specifications that are indicated as active.

13. The system of claim 12, wherein the set of one or more testing specifications is a hierarchical set that relates at least some of the testing specifications to each other according to a hierarchy.

14. The system of claim 13, wherein accessing the activation information to determine one or more testing specifications that are indicated as active includes identifying active testing specifications along a path up the hierarchy between the first testing specification and a root of the hierarchy.

15. The system of claim 12, wherein the processing further includes: while traversing the representation, performing any local tests specified in any active testing specifications based at least in part on stored values of attributes of one or more recognized portions of the computer program.

16. The system of claim 12, wherein the processing further includes: while traversing the representation, performing any aggregation functions specified in any active testing specifications based at least in part on stored values of attributes of one or more recognized portions of the computer program.

17. The system of claim 16, wherein the processing further includes: after traversing the representation, performing any global tests specified in any active testing specifications based at least in part on stored results of any aggregation functions performed while traversing the representation.

18. The system of claim 1, wherein the representation of the computer program is a graph based-representation and the elements include: nodes that represent at least some of the recognizable portions, and links that represent relationships between the recognizable portions represented by the nodes.

19. The system of claim 18, wherein the graph-based representation includes a dataflow graph that includes: processing components represented by the nodes, and flows of data between processing components represented by the links.

20. The system of claim 19, wherein at least some of the recognizable portions include a flow of data between processing components.

21. The system of claim 19, wherein at least some of the recognizable portions include an input or output port of a processing component.

22. The system of claim 19, wherein at least some of the recognizable portions include a parameter associated with a processing component or a flow of data between processing components.

23. The system of claim 18, wherein the graph-based representation includes a control flow graph that includes: basic blocks of code represented by the nodes, and changes of control between basic blocks represented by the links.

24. The system of claim 1, the testing further including receiving user input for specifying at least one testing specification of the set of one or more testing specifications.

25. The system of claim 24, wherein at least some of the attribute information is predetermined before at least some of the user input is received.

26. A computing system for configurable testing of a computer program, the computing system including:
means for storing a set of one or more testing specifications, and attribute information defining one or more attributes of a recognizable portion of the computer program; and
means for processing the computer program according to at least a first testing specification associated with the computer program, the first testing specification including at least a first test that applies to multiple portions of the computer program, the processing including:
traversing a representation of the computer program that includes elements that represent recognizable portions of the computer program,
while traversing the representation, recognizing recognizable portions of the computer program,
while traversing the representation, for at least a first recognized portion of the computer program, storing one or more values of one or more attributes of the first recognized portion of the computer program, wherein each attribute whose value is stored while traversing the representation is defined by the attribute information as being an attribute of one or more of the recognizable portions of the computer program,
performing any aggregation functions specified in the first testing specification based at least in part on stored values of attributes of one or more recognized portions of the computer program, and performing the first test specified in the first testing specification based at least in part on stored results of any aggregation functions performed while traversing the representation.

27. A method for configurable testing of a computer program, the method including:
storing a set of one or more testing specifications, and attribute information defining one or more attributes of a recognizable portion of the computer program; and
processing, using at least one processor, the computer program according to at least a first testing specification associated with the computer program, the first testing specification including at least a first test that applies to multiple portions of the computer program, the processing including:
traversing a representation of the computer program that includes elements that represent recognizable portions of the computer program,
while traversing the representation, recognizing recognizable portions of the computer program,
while traversing the representation, for at least a first recognized portion of the computer program, storing one or more values of one or more attributes of the first recognized portion of the computer program, wherein each attribute whose value is stored while traversing the representation is defined by the attribute information as being an attribute of one or more of the recognizable portions of the computer program,
performing any aggregation functions specified in the first testing specification based at least in part on stored values of attributes of one or more recognized portions of the computer program, and
performing the first test specified in the first testing specification based at least in part on stored results of any aggregation functions performed while traversing the representation.

28. The method of claim 27, wherein the processing further includes: performing at least one test specified in at least the first testing specification based at least in part on stored values of attributes of one or more recognized portions of the computer program.

29. The method of claim 28, wherein the first testing specification includes a test that tests at least one characteristic of the computer program that does not represent an error that would prevent the computer program from executing.

30. The method of claim 28, wherein the first testing specification includes a test that tests at least one characteristic of the computer program associated with code reuse efficiency.

31. The method of claim 28, wherein the first testing specification includes a test that tests at least one characteristic of the computer program associated with memory use constraints.

32. The method of claim 31, wherein the characteristic of the computer program associated with memory use constraints includes a maximum amount of main memory that a particular recognized portion of the computer program is allowed to use when the computer program executes.

33. The method of claim 28, wherein the first testing specification includes a test that tests a number of times at least one particular operation is used in the computer program.

34. The method of claim 28, wherein the first testing specification includes a test that references a value of a name attribute of a recognizable portion of the computer program to determine whether to continue applying the test.

35. The method of claim 28, the processing further including presenting in a user interface a result of at least one test, the result being visually associated with a displayed portion of the computer program on which the test was performed.

36. The method of claim 27, wherein the storage medium stores activation information indicating which of the testing specifications are active.

37. The method of claim 36, wherein at least one of the testing specifications includes at least one local test that applies to a particular portion of the computer program, and at least one of the testing specifications includes at least one global test that applies to multiple portions of the computer program.

38. The method of claim 37, wherein the processing further includes: accessing the activation information to determine one or more testing specifications that are indicated as active.

39. The method of claim 38, wherein the set of one or more testing specifications is a hierarchical set that relates at least some of the testing specifications to each other according to a hierarchy.

40. The method of claim 39, wherein accessing the activation information to determine one or more testing specifications that are indicated as active includes identifying active testing specifications along a path up the hierarchy between the first testing specification and a root of the hierarchy.

41. The method of claim 38, wherein the processing further includes: while traversing the representation, performing any local tests specified in any active testing specifications based at least in part on stored values of attributes of one or more recognized portions of the computer program.

42. The method of claim 38, wherein the processing further includes: while traversing the representation, performing any aggregation functions specified in any active testing specifications based at least in part on stored values of attributes of one or more recognized portions of the computer program.

43. The method of claim 42, wherein the processing further includes: after traversing the representation, performing any global tests specified in any active testing specifications based at least in part on stored results of any aggregation functions performed while traversing the representation.

44. The method of claim 27, wherein the representation of the computer program is a graph based-representation and the elements include: nodes that represent at least some of the recognizable portions, and links that represent relationships between the recognizable portions represented by the nodes.

45. The method of claim 44, wherein the graph-based representation includes a dataflow graph that includes: processing components represented by the nodes, and flows of data between processing components represented by the links.

46. The method of claim 45, wherein at least some of the recognizable portions include a flow of data between processing components.

47. The method of claim 45, wherein at least some of the recognizable portions include an input or output port of a processing component.

48. The method of claim 45, wherein at least some of the recognizable portions include a parameter associated with a processing component or a flow of data between processing components.

49. The method of claim 44, wherein the graph-based representation includes a control flow graph that includes: basic blocks of code represented by the nodes, and changes of control between basic blocks represented by the links.

50. The method of claim 27, the testing further including receiving user input for specifying at least one testing specification of the set of one or more testing specifications.

51. The method of claim 50, wherein at least some of the attribute information is predetermined before at least some of the user input is received.

52. Software stored on a non-transitory medium, for configurable testing of a computer program, the software including instructions for causing a computing system to:
store a set of one or more testing specifications, and attribute information defining one or more attributes of a recognizable portion of the computer program; and
process the computer program according to at least a first testing specification associated with the computer program, the first testing specification including at least a first test that applies to multiple portions of the computer program, the processing including:
traversing a representation of the computer program that includes elements that represent recognizable portions of the computer program,
while traversing the representation, recognizing recognizable portions of the computer program,
while traversing the representation, for at least a first recognized portion of the computer program, storing one or more values of one or more attributes of the first recognized portion of the computer program, wherein each attribute whose value is stored while traversing the representation is defined by the attribute information as being an attribute of one or more of the recognizable portions of the computer program,
performing any aggregation functions specified in the first testing specification based at least in part on stored values of attributes of one or more recognized portions of the computer program, and
performing the first test specified in the first testing specification based at least in part on stored results of any aggregation functions performed while traversing the representation.

53. The software of claim 52, wherein the processing further includes: performing at least one test specified in at least the first testing specification based at least in part on stored values of attributes of one or more recognized portions of the computer program.

54. The software of claim 53, wherein the first testing specification includes a test that tests at least one characteristic of the computer program that does not represent an error that would prevent the computer program from executing.

55. The software of claim 53, wherein the first testing specification includes a test that tests at least one characteristic of the computer program associated with code reuse efficiency.

56. The software of claim 53, wherein the first testing specification includes a test that tests at least one characteristic of the computer program associated with memory use constraints.

57. The software of claim 56, wherein the characteristic of the computer program associated with memory use constraints includes a maximum amount of main memory that a particular recognized portion of the computer program is allowed to use when the computer program executes.

58. The software of claim 53, wherein the first testing specification includes a test that tests a number of times at least one particular operation is used in the computer program.

59. The software of claim 53, wherein the first testing specification includes a test that references a value of a name attribute of a recognizable portion of the computer program to determine whether to continue applying the test.

60. The software of claim 53, the processing further including presenting in a user interface a result of at least one test, the result being visually associated with a displayed portion of the computer program on which the test was performed.

61. The software of claim 52, wherein the storage medium stores activation information indicating which of the testing specifications are active.

62. The software of claim 61, wherein at least one of the testing specifications includes at least one local test that applies to a particular portion of the computer program, and at least one of the testing specifications includes at least one global test that applies to multiple portions of the computer program.

63. The software of claim 62, wherein the processing further includes: accessing the activation information to determine one or more testing specifications that are indicated as active.

64. The software of claim 63, wherein the set of one or more testing specifications is a hierarchical set that relates at least some of the testing specifications to each other according to a hierarchy.

65. The software of claim 64, wherein accessing the activation information to determine one or more testing specifications that are indicated as active includes identifying active testing specifications along a path up the hierarchy between the first testing specification and a root of the hierarchy.

66. The software of claim 63, wherein the processing further includes: while traversing the representation, performing any local tests specified in any active testing specifications based at least in part on stored values of attributes of one or more recognized portions of the computer program.

67. The software of claim 63, wherein the processing further includes: while traversing the representation, performing any aggregation functions specified in any active testing specifications based at least in part on stored values of attributes of one or more recognized portions of the computer program.

68. The software of claim 67, wherein the processing further includes: after traversing the representation, performing any global tests specified in any active testing specifications based at least in part on stored results of any aggregation functions performed while traversing the representation.

69. The software of claim 52, wherein the representation of the computer program is a graph based-representation and the elements include: nodes that represent at least some of the recognizable portions, and links that represent relationships between the recognizable portions represented by the nodes.

70. The software of claim 69, wherein the graph-based representation includes a dataflow graph that includes: processing components represented by the nodes, and flows of data between processing components represented by the links.

71. The software of claim 70, wherein at least some of the recognizable portions include a flow of data between processing components.

72. The software of claim 70, wherein at least some of the recognizable portions include an input or output port of a processing component.

73. The software of claim 70, wherein at least some of the recognizable portions include a parameter associated with a processing component or a flow of data between processing components.

74. The software of claim 69, wherein the graph-based representation includes a control flow graph that includes: basic blocks of code represented by the nodes, and changes of control between basic blocks represented by the links.

75. The software of claim 52, the testing further including receiving user input for specifying at least one testing specification of the set of one or more testing specifications.

76. The software of claim 75, wherein at least some of the attribute information is predetermined before at least some of the user input is received.

\* \* \* \* \*